(12) United States Patent
Nimbavikar et al.

(10) Patent No.: US 10,687,254 B2
(45) Date of Patent: Jun. 16, 2020

(54) DYNAMIC QUALITY OF SERVICE IN WIRELESS NETWORKS

(71) Applicant: T-Mobile USA, Inc., Bellevue, WA (US)

(72) Inventors: Gunjan Nimbavikar, Bellevue, WA (US); Yasmin Karimli, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 3 days.

(21) Appl. No.: 16/107,459

(22) Filed: Aug. 21, 2018

(65) Prior Publication Data

US 2020/0068446 A1     Feb. 27, 2020

(51) Int. Cl.
*H04W 28/24*     (2009.01)
*H04L 12/813*    (2013.01)
(Continued)

(52) U.S. Cl.
CPC .............. *H04W 28/24* (2013.01); *H04L 47/20* (2013.01); *H04L 67/306* (2013.01); (Continued)

(58) Field of Classification Search
CPC . H04W 24/08; H04W 28/0268; H04W 28/24; H04W 28/0289; H04W 36/22; H04W 72/10; H04W 47/20; H04W 67/306; H04W 4/00; H04W 8/20; H04W 24/00; H04W 24/02; H04W 28/00; H04W 28/02; H04W 28/0284; H04W 28/16; H04W 28/18; H04W 28/20; H04W 28/22; H04W 28/26; H04W 48/00; H04W 48/02; H04W 48/04; H04W 48/06; H04W 48/16; H04W 48/18; H04W 48/20; H04W 52/28; H04W 72/085; H04W 72/087; H04W 72/1252; H04W 72/1257; H04W 88/16; H04L 47/20; H04L 67/306; H04L 47/10; H04L 47/78; H04L 47/788; H04L 47/80; H04L 47/801; H04L 67/30; H04L 12/813; H04L 29/08; G06F 9/44505; G06F 16/9535
See application file for complete search history.

(56) References Cited

U.S. PATENT DOCUMENTS

9,510,243 B2 *  11/2016  Kordianowski ........ H04W 4/08
9,554,392 B2 *  1/2017  Shaw ....................... H04W 4/70
(Continued)

*Primary Examiner* — Tri H Phan
(74) *Attorney, Agent, or Firm* — Lee & Hayes, P.C.

(57) ABSTRACT

Techniques for dynamically determining a Quality of Service (QoS) for wireless communications, and in particular, for 5G wireless communications, are discussed herein. For example, a user equipment (UE) can send a resource request to a base station associated with a radio access network (RAN). In some instances, the resource request can include identity information, such as an IMEI or an IMSI. The RAN can send a profile request to a user profile database, which can provide profile information to a policy control function (PCF) and/or the RAN. The profile information can be used to select a QoS for a communication associated with the UE based at least in part on the user profile information, a communication type, and/or a state of the network. The RAN can exchange data with the UE in accordance with the selected QoS to ensure various service levels associated with the communication.

20 Claims, 6 Drawing Sheets

(51) Int. Cl.
  *H04L 29/08* (2006.01)
  *H04W 24/08* (2009.01)
  *H04W 28/02* (2009.01)
  *H04W 72/10* (2009.01)

(52) U.S. Cl.
  CPC ....... *H04W 24/08* (2013.01); *H04W 28/0268* (2013.01); *H04W 28/0289* (2013.01); *H04W 72/10* (2013.01)

(56) References Cited

U.S. PATENT DOCUMENTS

| | | | |
|---|---|---|---|
| 9,961,624 B1* | 5/2018 | Zait | H04W 48/18 |
| 10,243,860 B2* | 3/2019 | Szilagyi | H04L 41/0853 |
| 10,306,500 B2* | 5/2019 | Jeong | H04W 4/70 |
| 10,326,675 B2* | 6/2019 | Raleigh | H04L 47/19 |
| 10,327,177 B1* | 6/2019 | Mathison | H04W 28/24 |
| 10,341,872 B2* | 7/2019 | Mathison | H04W 8/08 |
| 10,439,935 B2* | 10/2019 | Mathison | H04W 8/24 |
| 2018/0006954 A1* | 1/2018 | Arora | H04W 4/70 |
| 2019/0037409 A1* | 1/2019 | Wang | H04W 16/04 |
| 2019/0223023 A1* | 7/2019 | Altay | H04W 16/02 |
| 2019/0281468 A1* | 9/2019 | Mathison | H04W 8/08 |
| 2019/0281494 A1* | 9/2019 | Chan | H04W 72/10 |

* cited by examiner

DYNAMIC QUALITY OF SERVICE IN WIRELESS NETWORKS

BACKGROUND

Traditional wireless communications have used various mechanisms to ensure quality levels for various communications. For example, a Quality of Service class identifier (QCI) has been used to assign characteristics to wireless traffic based on bearer types assigned to device communications. However, this framework lacks flexibility and may not result in an optimal use of network resources or service levels provided to appropriate devices or users.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Systems, devices, and methods are directed to dynamically determining a Quality of Service (QoS) for wireless communications, and in particular, for 5G wireless communications. For example, a user equipment (UE) can send a resource request to a base station associated with a radio access network (RAN). In some instances, the resource request can include identity information, such as an international mobile equipment identity (IMEI) or an international mobile subscriber identity (IMSI). The RAN can send a request, based on the identity information, to a policy control function (PCF), which may include a policy and charging rules function (PCRF) and an access network discovery and selection function (ANDSF). The PCF can access a user profile database, which may store subscriber information and/or QoS policies associated with various subscribers or subscriber levels. The user profile database can provide at least user profile information to the PCF and/or the RAN, which in turn, can utilize the user profile information to select a QoS for a communication associated with the UE. In some cases, selecting a QoS can be based at least in part on the user profile information (e.g., indicating a priority level associated with a user and/or device), a communication type (e.g., voice, text, video, data, etc.), a state of the network (e.g., congestion, delay, etc.), and the like. The RAN can send and receive data to and from the UE in accordance with the selected QoS to ensure various service levels associated with the communication.

By way of example, and without limitation, a first UE and a second UE can send first and second identity information, respectively, along with requests for resources when establishing a communication with a RAN. The RAN can access user profile information associated with the first UE and the second UE. In one example, the first UE can be associated with a first subscriber level that is higher (better) than a second subscriber level associated with the second UE. In a case where the first UE and the second UE are requesting resources for a same communication type, the first UE may receive frequency resources with a better QoS than the second UE. In a case where the second UE is requesting resources for a voice call and the first UE is requesting resources for web browsing, the first UE and the second UE may receive the same QoS despite the voice call being associated with more stringent requirements for packet delay, packet jitter, etc. In some instances, when a resource request is associated with an emergency call, a highest (best) QoS can be allocated to the UE, regardless of profile information or network state. Of course, these examples are not intended to be limiting, and other examples are contemplated herein.

In some instances, a different QoS can be associated with different communications associated with a same UE. For example, a QoS can be associated with a first communication (e.g., a voice call) involving the UE and the network. As part of establishing a second communication (e.g., a data session), a second QoS can be associated with the second communication involving the UE and the network. Thus, in some instances, a QoS can be assigned and/or associated with a communication based on a communication type, and may differ even when involving the same UE.

In some instances, a QoS can be updated during the course of a communication. For example, at a first time, a first QoS can be associated with a communication based on a first congestion level of a network. At a second time, the network may be associated with a second congestion level that is higher or lower than the first congestion level. Accordingly, the QoS can be adjusted based on the congestion level during a communication.

In some instances, a base station or computing device implementing the techniques discussed herein can use frequency resources in at least one of an LTE or 5G Band 71 (e.g., a 600 MHz band), an LTE Band 48 (e.g., 3500 MHz), and the like. In some instances, the frequency resources can include, but are not limited to, LTE or 5G Band 1 (e.g., 2080 MHz), LTE or 5G Band 2 (1900 MHz), LTE or 5G Band 3 (1800 MHz), LTE Band 4 (1700 MHz), LTE or 5G Band 5 (850 MHz), LTE or 5G Band 7 (2600 MHz), LTE or 5G Band 8 (900 MHz), LTE or 5G Band 20 (800 MHz), LTE or 5G Band 28 (700 MHz), LTE or 5G Band 38 (2600 MHz), LTE or 5G Band 41 (2500 MHz), LTE or 5G Band 50 (1500

MHz), LTE or 5G Band 51 (1500 MHz), LTE or 5G Band 66 (1700 MHz), LTE or 5G Band 70 (2000 MHz), LTE or 5G Band 74 (1500 MHz), 5G Band 257 (28 GHz), 5G Band 258 (26 GHz), 5G Band 260 (39 GHz), 5G Band 261 (28 GHz), and the like. In some instances, frequency resources in the range of 600 MHz-6000 MHz can be referred as "low-band" and "mid-band." In some instances, the frequency resources may include "millimeter wave" bands including, but not limited to 26 GHz, 28 GHz, 38 GHz, 60 GHz, and the like. The techniques discussed herein are applicable to any frequency resources, and are not limited to those expressly recited above. For example, in some cases, frequency resources can include any licensed or unlicensed bands. Other examples of frequency resources may include those associated with $2^{nd}$ Generation (2G) radio access technologies, $3^{rd}$ Generation (3G) radio access technologies, and the like.

In some instances, the systems, devices, and techniques described herein can improve a functioning of a network. For example, in low-band or mid-band frequency resources (e.g., 600-6000 MHz), the propagation characteristics of the waves allow the frequency resources to be used to implement a wide coverage area (e.g., a wide area network (WAN)), and is not limited to microcells, femtocells, or picocells (e.g., to which some millimeter-wave frequency resources may be limited). Thus, by using a low-band or mid-band frequency resource, a relatively larger geographic area may be served by a base station. Further, as a size of a coverage area increases, a number of users that can be served by a base station may increase as well, potentially leading to congestion scenarios caused by excessive traffic. On the other hand, because base stations using millimeter wave resources may cover a relatively small coverage area (and a corresponding small number of devices), dynamic QoS management may not be needed or is not envisioned. In this manner, in some instances, as dynamic QoS assignment can be implemented as needed (e.g., when congestion is detected), the techniques discussed herein can be used across all frequency resources. Accordingly, incorporating dynamic QoS management into such 5G networks provides a more flexible framework that can be used over a range of frequency resources, including low-band, mid-band, and millimeter wave bands. By dynamically determining QoS based on device identifiers, profile information, congestion levels, communication types, or any other appropriate consideration for QoS, a 5G network can optimize an amount and/or quality of traffic provided to users, both individually and in the aggregate. These and other improvements to the functioning of a computer and network are discussed herein.

The systems, devices, and techniques described herein can be implemented in a number of ways. Example implementations are provided below with reference to the following figures.

Figure 1:
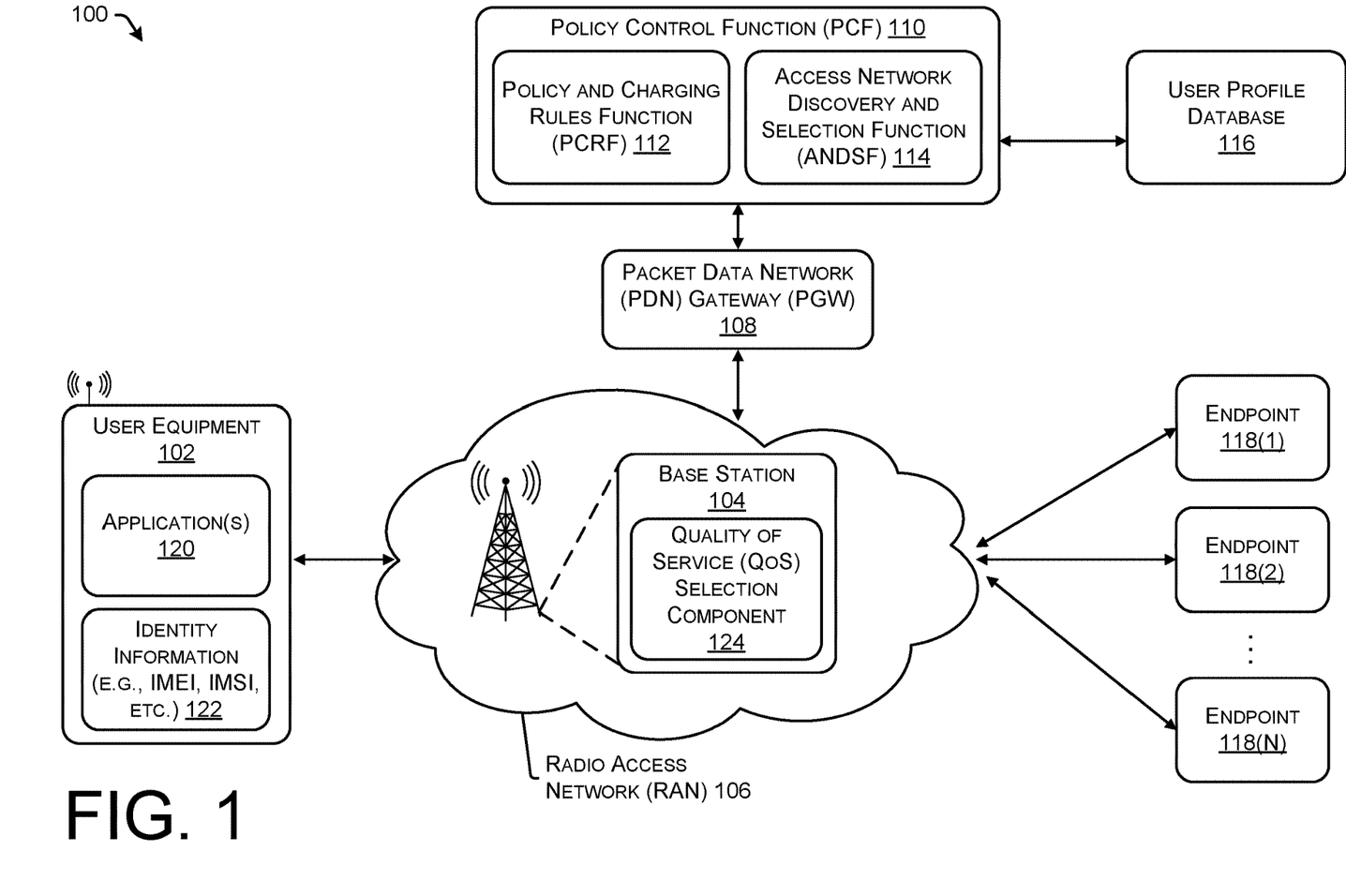
FIG. 1 illustrates an example environment including a user equipment and a radio access network including functionality to dynamically determine a Quality of Service (QoS) for a communication, in accordance with embodiments of the disclosure.

FIG. 1 illustrates an example environment 100 including a user equipment and a radio access network including functionality to dynamically determine a Quality of Service (QoS) for a communication, in accordance with embodiments of the disclosure. For example, the environment 100 includes a user equipment 102 that can receive and transmit information via a base station 104 included in a radio access network (RAN) 106.

In some instances, the RAN 106 may be communicatively coupled with a packet data network (PDN) gateway (PGW) 108, which in turn can be communicatively coupled with a policy control function (PCF) 110. The PCF 110 can include a policy and charging rules function (PCRF) 112 and an access network discovery and selection function (ANDSF) 114. In turn, the PCF 110 can be communicatively coupled to a user profile database 116 to provide user profile information, as discussed herein. The RAN 106 may be further in communication with one or more endpoints 118(1), 118(2), . . . , 118(N) (also referred to as an endpoint 118) (where N is an integer).

Examples of the user equipment (UE) 102 can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data over a network. Additional examples of the user equipment 102 include, but are not limited to, smart devices such as televisions, refrigerators, washing machines, dryers, smart mirrors, coffee machines, lights, lamps, temperature sensors, leak sensors, water sensors, electricity meters, parking sensors, music players, headphones, or any other electronic appliances that can generate, request, receive, transmit, or exchange voice, video, and/or digital data over a network.

The user equipment (UE) 102 can further include one or more application(s) 120 and identity information 122 (e.g., an international mobile equipment identity (IMEI), an international mobile subscriber identity (IMSI), username, telephone number, email address, etc.). In some instances, the application(s) 120 can include, but are not limited to, internet browsing applications, music/video streaming applications, voice calling applications, messaging applications, and the like. Of course, the application(s) 120 can include any application that is configured to send or receive information via a network, as discussed herein. In some instances, a communication type can be based at least in part on an identifier associated with the application(s) 120.

As introduced above, the RAN 106 can include the base station 104, which in turn can include a Quality of Service (QoS) selection component 124. In some instances, the QoS selection component 124 can include functionality to select a QoS level for a communication involving the UE 102 (or any UE in communication with the base station 104). In some instances, as discussed herein, the QoS selection component 124 can receive one or more policies associated with QoS selection from the PCF 110, for example, and can select a QoS based at least in part on the one or more policies. As discussed herein, the QoS selection component 124 can select a QoS for a communication based at least in part on one or more of identity information, communication type, profile information (e.g., user profile information), subscriber level, congestion level (or other network state information), and the like.

In general, the RAN 106 can be implemented as a variety of technologies to provide wired and/or wireless access to the network, as discussed herein. In some instances, the RAN 106 can include a 3GPP RAN, such a GSM/EDGE RAN (GERAN), a Universal Terrestrial RAN (UTRAN), or an evolved UTRAN (E-UTRAN), or alternatively, a "non-3GPP" RAN, such as a Wi-Fi RAN, or another type of wireless local area network (WLAN) that is based on the IEEE 802.11 standards. Further, the RAN 106 can include any number and type of transceivers and/or base stations representing any number and type of macrocells, microcells, picocells, or femtocells, for example, with any type or amount of overlapping coverage or mutually exclusive coverage.

In general, the PGW 108 can be implemented as a network function including functionality to enforce policies, manage QoS (at least in part), and to inspect packets for viruses or other data. In some instances, the PGW 108 can include functionality to provide an interface between the RAN 106 and other packet data networks, such as the internet, or other session initiation protocol (SIP)-based IP (internet protocol) multimedia subsystems (IMS) networks.

In general, the PCF 110 can be implemented as a network function including functionality to support unified policy framework to govern network behavior, provide policy rules to control plane functions and/or enforce such rules, and/or implement a front end to access subscription information relevant for policy decisions in a data repository.

In general, the PCRF 112 can be implemented as a network function including functionality to monitor data usage of UEs in the environment. For example, the PCRF 112 can manage policies and can send or receive QoS setting information for each user session for accounting for each communication. In some instances, the PCRF 112 can include functionality to charge subscribers (e.g., associated with UEs) based on their volume or usage of high-bandwidth applications, determine charges associated with QoS guarantees, limit usage of applications while a user is roaming (e.g., outside of a subscriber-managed network), or lower the bandwidth of UEs using bandwidth heavy applications during peak usage times (e.g., based on time of data or network conditions associated with congestion, etc.).

In general, the ANDSF 114 can be implemented as a network function including functionality to offload data traffic from a network. For example, when the UE 102 is exposed to a plurality of networks (e.g., the base station 104 and a Wi-Fi network), the ANDSF 114 can provide policies to the UE 102 which may influence when the UE 102 switches between the various networks.

As discussed above, in some instances, the PCF 110 can be communicatively coupled with the user profile database 116. The user profile database 116 can store information associated with a user, such as a subscriber level (e.g., a priority level), subscriber data limits (e.g., maximum amount of data per month, maximum instantaneous bandwidth, etc.), endpoint partnerships (e.g., indicating whether usage of ones of the endpoints 118(1), 118(2), . . . , 118(N) counts towards the subscriber data limits, and the like). Accordingly, functions performed by the PCRF 112 and/or the ANDSF 114 can be based at least in part on the user profile information as well. For example, when determining a bill or charges associated with a UE or subscriber, the PCRF 112 can determine data usage based at least in part on a status of a subscriber level. In another example, the ANDSF 114 can determine when a UE should be offloaded to another network (e.g., to a Wi-Fi network) based at least in part on user profile information. Of course, these functionalities are examples and are not limited to those expressly discussed herein.

In some instances, the environment 100 can further include one or more communication servers to facilitate communications by and between the various devices in the environment 100. That is, environment 100 can include any computing devices implementing various aspects of one or more of second, third, fourth, and fifth generation (2G, 3G, 4G, 5G) cellular-wireless access technologies, which may be cross-compatible and may operate collectively to provide data communication services. Global Systems for Mobile (GSM) is an example of 2G telecommunications technologies; Universal Mobile Telecommunications System (UMTS) is an example of 3G telecommunications technologies; Long Term Evolution (LTE), including LTE Advanced, and Evolved High-Speed Packet Access (HSPA+) are examples of 4G telecommunications technologies; and New Radio (NR) is an example of 5G communication technologies. Thus, the environment 100 may implement GSM, UMTS, LTE/LTE Advanced, and/or NR telecommunications technologies. The environment 100 may include, but is not limited to, a combination of: base transceiver stations BTSs (e.g., NodeBs, Enhanced-NodeBs, gNodeBs), Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), an Internet Protocol (IP) Multimedia Subsystem (IMS), or any other data traffic control entity configured to communicate and/or route data packets between the user equipment 102, the RAN 106, and the endpoints 118. In some embodiments, the RAN 106, the PGW 108, the PCF 110, and the user profile database 116 are operated by a service provider. While FIG. 1 illustrates the environment 100, it is understood in the context of this document, that the techniques discussed herein may also be implemented in other networking technologies, such as nodes that are part of a wide area network (WAN), metropolitan area network (MAN), local area network (LAN), neighborhood area network (NAN), personal area network (PAN), or the like.

One use case of the environment 100 is discussed below. For example, the UE 102 can send a resource request to the base station 104 associated with RAN 106. In some instances, the resource request can include identity information 122 stored on the UE 102. The RAN 106 can send a request, based at least in part on the identity information 122, to the PCF 110. The PCF 110 can access the user profile database 116, which may store subscriber information and/or QoS policies associated with various subscribers or subscriber levels. The user profile database 116 can provide at least user profile information to the PCF 110 and/or the RAN 106, which, in turn, can utilize the user profile information to select a QoS for a communication associated with the UE 102. In some cases, selecting a QoS can be based at least in part on the user profile information, a communication type (e.g., voice, text, video, data, etc.), a state of the network (e.g., congestion, delay, or any other appropriate consideration for QoS), and the like. The RAN 106 can send and receive data to and from the UE 102 and one or more endpoints 118 in accordance with the selected QoS to ensure various service levels associated with the communication.

Figure 2:
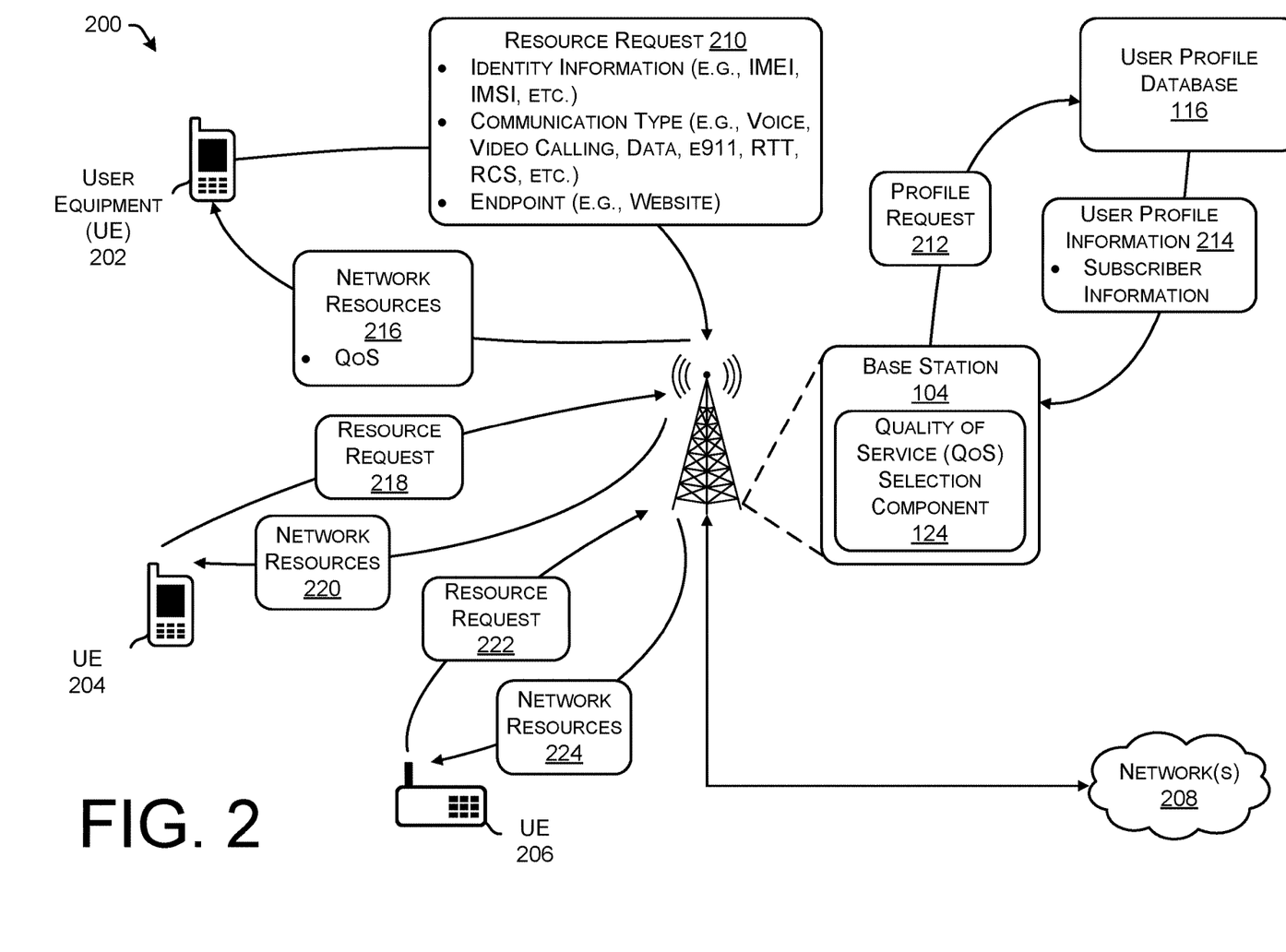
FIG. 2 illustrates an example environment including multiple user equipment (e.g., smart phones, Internet of Things (IoT) devices, etc.) sending resource requests to a base station, and the base station providing network resources to the user equipment based at least in part on profile information, in accordance with embodiments of the disclosure.

FIG. 2 illustrates an example environment 200 including multiple user equipment sending resource requests to a base station and the base station providing network resources to the user equipment based at least in part on profile information, in accordance with embodiments of the disclosure.

For example, the environment 200 can include one or more user equipment such as UE 202, UE 204, and UE 206. In some instances, the UEs 202 and 204 may comprise a mobile phone, while the UE 206 may comprise a water sensor (e.g., an Internet of Things (IoT) device). Of course, the UEs 202, 204, and 206 may comprise any number or type of devices, as discussed herein. Examples of IoT devices include, but are not limited to, a television, a sound device (e.g., speaker(s), amplifier(s), receiver(s), etc.), a refrigerator, a microwave, a stove, a washing machine, a dryer, a lightbulb, a lamp, a door lock, a sprinkler system, a power sensor, a temperature sensor, a humidity sensor, and the like.

The UEs 202, 204, and 206 can be communicatively coupled with the base station 104, which in turn can be communicatively coupled with the user profile database 116.

Further, the base station 104 can be communicatively coupled with one or more network(s) 208, such as the internet.

In one example, the UE 202 can send a resource request 210 to the base station 104. In some instances, the resource request 210 can include, but is not limited to, identity information (e.g., IMEI, IMSI, username, email address, phone number, etc.), communication type (e.g., voice call, video call, e911, real time text (RTT), rich communication services (RCS), short message service (SMS), multimedia messaging service (MMS), web browsing (e.g., data/application), and the like), endpoint information (e.g., a website address, a server address, etc.), and the like. In some implementations, the resource request 210 can further include location information. In some instances, the resource request 210 can include an indication of subscriber information. One of ordinary skill in the art will understand that the Resource Request 210 can include any type of appropriate information to identify the resources requested.

The base station 104 can receive the resource request 210 and can determine whether to send a request for profile information based on the resource request 210. For example, in some instances, the base station 104 can store profile information locally at the base station 104. In some instances, the base station 104 may be facilitating a first communication with the UE 202 and may already have received profile information associated with the UE 202. In a case where no profile information is stored locally, the base station 104 can send a profile request 212, which may ultimately be received by the user profile database 116. Upon receipt of the profile request 212, the user profile database 116 can determine user profile information associated with the identity information. In some instances, the user profile database 116 can send user profile information 214, which may ultimately be received by the base station 104. In some instances, the user profile information may include subscriber information such as a priority level or a type of account associated with a UE and/or a user. In some instances, the user profile information 214 can be received by the PCF 110 and one or more policies can be selected by the PCRF 112 and/or the ANDSF 114 and provided to the base station 104. In some instances, the one or more policies selected by the PCRF 112 and/or the ANDSF 114 can be used by the base station 104 to dynamically select a QoS, as discussed herein.

Although FIG. 2 illustrates one profile request 212 and one instance of user profile information 214, the base station 104 may send any number of requests and may receive any number of instances of user profile information.

Upon receipt of the user profile information 214, the Quality of Service (QoS) selection component 124 can select a QoS for a communication involving the UE 202 and the network(s) 208, for example. The base station 104 can allocate network resources 216 for the UE 202, which may be based on the QoS selected by the QoS selection component 124. That is, a selected QoS may indicate parameters for bandwidth (e.g., a minimum bandwidth), transmission delay (e.g., a maximum delay budget), a packet jitter (e.g., a maximum variability in a delay associated with packets), or a packet loss (e.g., a maximum number or percentage of lost packets during transmission) associated with the QoS, or any other appropriate consideration for QoS. Accordingly, the base station 104 may facilitate a communication (e.g., assign bandwidth, send/pull packets to and from queues, select transmission paths, select networks (e.g., 5G, 4G, Wi-Fi, etc.)) based at least in part on the selected QoS.

The UE 204 can send a resource request 218, and following an exchange of profile request and user profile information (e.g., the profile request 212 and the user profile information 214), the UE 204 can receive one or more network resources 220.

Similarly, the UE 206 can send a resource request 222, and following an exchange of profile request and user profile information (e.g., the profile request 212 and the user profile information 214), the UE 206 can receive one or more network resources 224.

By way of example, and without limitation, the UEs 202, 204, and 206 can be assigned a respective QoS based on a subscriber level (e.g., low priority, medium priority, high priority, and the like). For example, the UE 206 may comprise a IoT sensor, and may be associated with a low priority level. Accordingly, when the base station 104 is congested, a communication associated with the UE 206 may receive a lowest (relatively low priority) QoS. In another example, the UE 204 may be associated with a medium priority level (e.g., based on a subscription plan), while the UE 202 may be associated with a high priority level. In some instances, the UE 206 may receive a lower QoS than the UE 202 and 204, based at least in part on the subscriber level (e.g., regardless of communication type). In some instances, if the UE 202 and the UE 204 initiate a communication of the same communication type, and the base station 104 is experiencing congestion, a QoS of the UE 204 may be downgraded first before downgrading a QoS of the UE 202. In some examples, the UE 204 may be handed over to a Wi-Fi network based on the QoS priority of the UE 204 being lower than the QoS priority of the UE 202. In another example, if the UE 204 is initiating a voice call (or any communication associated with a guaranteed bit rate, for example), while the UE 202 is initiate a data session (e.g., web browsing), the UE 204 and the UE 202 may receive the same QoS associated with the communication, even if the communication types are not the same. Of course, these examples are not intended to be limiting, and other configurations and contemplated herein.

By way of another example, if the UE 206 is an IoT device for gas leakage detection (e.g., and is associated with a high priority), and the UE 202 is a mobile phone making a voice call (e.g., associated with a medium or high priority), the UE 202 may receive the same QoS as the UE 206.

By way of another example, if the UE 202 is a highest priority level subscriber device performing video streaming, and the UE 204 is a mobile phone making an emergency call, the QoS of the UE 202 may be downgraded or reduced while the UE 204 may receive the highest QoS.

By way of another example, if the UE 202 is a highest priority level subscriber device performing video streaming and the UE 204 is a medium priority level making a voice call, the UEs 202 and 204 may receive the same QoS (e.g., when no congestion is present). In a case where congestion is detected (or any other appropriate consideration for QoS), the UE 202 may maintain a same QoS or may be downgraded before a QoS associated with the UE 204 is downgraded.

Figure 3:
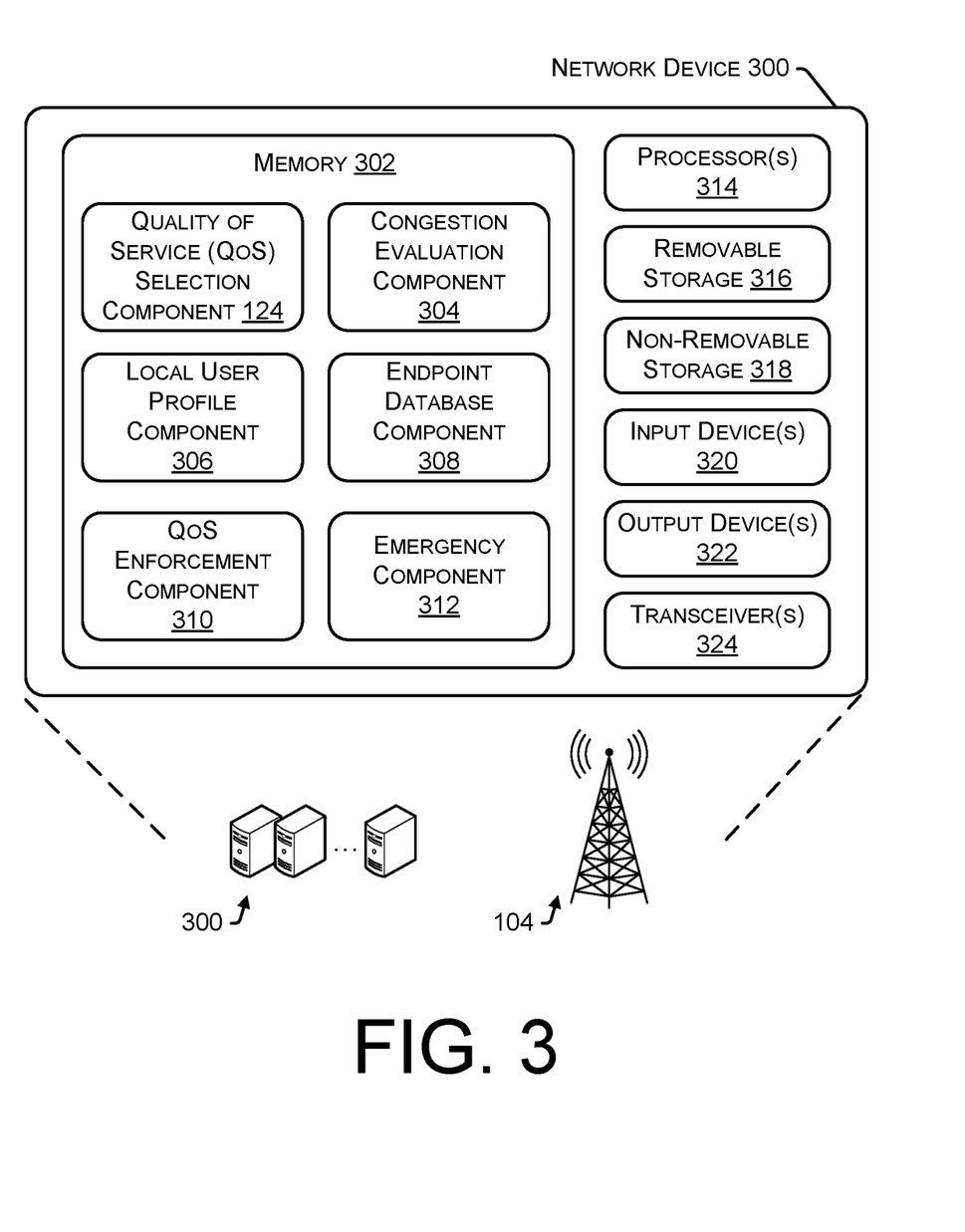
FIG. 3 illustrates an example network device configured to determine a QoS for communications based at least in part on a resource request and user profile information, in accordance with embodiments of the disclosure.

FIG. 3 illustrates an example network device 300 configured to determine a QoS for communications based at least in part on a resource request and user profile information, in accordance with embodiments of the disclosure. In some embodiments, the network device 300 can correspond to the base station 104, the RAN 106, the PCF 110, the PCRF 112, the ANDSF 114, and/or the user profile database 116 of FIG. 1. It is to be understood in the context of this disclosure that the network device 300 can be implemented as a single device or as a plurality of devices with components and data distributed among them.

As illustrated, the network device 300 comprises a memory 302 storing the Quality of Service (QoS) selection component 124, a congestion evaluation component 304, a local user profile component 306, an endpoint database component 308, a QoS enforcement component 310, and an emergency component 312. Also, the network device 300 includes processor(s) 314, a removable storage 316 and non-removable storage 318, input device(s) 320, output device(s) 322, and transceiver(s) 324.

In various embodiments, the memory 302 is volatile (such as RAM), non-volatile (such as ROM, flash memory, etc.) or some combination of the two. The Quality of Service (QoS) selection component 124, the congestion evaluation component 304, the local user profile component 306, the endpoint database component 308, the QoS enforcement component 310, and the emergency component 312 stored in the memory 302 can comprise methods, threads, processes, applications or any other sort of executable instructions. The Quality of Service (QoS) selection component 124, the congestion evaluation component 304, the local user profile component 306, the endpoint database component 308, the QoS enforcement component 310, and the emergency component 312 can also include files and databases.

In general, the Quality of Service (QoS) selection component 124 can include functionality to select a QoS for a communication for a UE based on identity information associated with a UE, congestion information associated with a network, a communication type, an endpoint, etc. In some instances, the QoS selection component 124 can receive one or more policies from a policy control function (e.g., the PCF 110), a policy and charging rules function (e.g., the PCRF 112), and/or an access network discovery and selection function (e.g., the ANDSF 114) and can select a QoS in accordance with the policies. In some instances, the QoS selection component 124 can select a QoS for each UE and/or for each communication associated with a UE. That is, different UEs having different identity information (e.g., different subscriber levels) can receive a different QoS even when conducting a communication of the same communication type, for example, in some instances, and different communications initiated by a same UE can have a different QoS based on the factors discussed herein.

The congestion evaluation component 304 can include functionality to determine one or more states of a network, such as congestion, to be used when dynamically determining QoS for individual communications, as discussed herein. For example, the congestion evaluation component 304 can determine congestion based on a number of elements, including but not limited to: a number of UEs or communications being handled by the network device (e.g., relative to the total number of connections available); an amount of bandwidth used; packet delay; packet jitter; a number of dropped packets; a number of retransmissions; or any other appropriate consideration for QoS. In some instances, each element can be associated with a threshold level that, when triggered, may lead to a determination that the network device 300 (or a network, more broadly) is congested.

The local user profile component 306 can include functionality to store user profile information locally at the network device 300. For example, and as discussed herein, the network device 300 can receive a resource request from a UE to initiate a communication. The local user profile component 306 can determine whether user profile information associated with the identity information (e.g., received in the resource request) is stored locally at the network device 300. If not, the local user profile component 306 can initiate a request for user profile information from a user profile database (e.g., the user profile database 116). In some instances, upon receiving user profile information, the local user profile component 306 can store the user profile information. In some instances, the local user profile component 306 can remove a user profile after a lapse of time following a termination of a communication.

The endpoint database component 308 can include functionality to determine a status of endpoints associated with a resource request from a UE. For example, the status of the endpoints may be used to determine a QoS and/or for the purposes of billing and/or tracking data usage. For example, in some instances, the first endpoint can be associated with a first website or first server such that resource requests directed to the first endpoint are associated with a first QoS, while a second endpoint can be associated with a second website or second server such that resource requests directed to the second endpoint are associated with a second QoS. In some instances, the first QoS and the second QoS can be different. In some instances, a status of an endpoint can be a dispositive factor in determining a QoS for a communication. For example, regardless of user profile information associated with a UE, a communication associated with a particular endpoint can be associated with a defined QoS. Of course, other implementations are contemplated herein.

The QoS enforcement component 310 can include functionality to monitor one or more communications to enforce, guarantee, or otherwise ensure that a particular QoS is actually provided for a communication. For example, the QoS enforcement component 310 can monitor a bandwidth, packet delay, packet jitter, or any other appropriate consideration for QoS, associated with a communication. If one or more factors of a communication are outside of a range or threshold associated with a particular QoS, the QoS enforcement component 310 can respond accordingly to ensure that an assigned QoS is associated with a particular communication. For example, the QoS enforcement component 310 can refuse connections, drop packets, reorder packet queues, etc., to enforce a QoS for one or more communications.

The emergency component 312 can include functionality to determine that a resource request is an emergency call and can initiate a communication. For example, the emergency component can bypass a request for user profile information and can assign a highest QoS to an emergency communication. In some instances, the emergency component 312 can downgrade a QoS associated with one or more other communications to provide network resources to an emergency communication. In some instances, the emergency component 312 can downgrade a QoS associated with one or more communications based at least in part on identity information associate with a UE, a communication type, an endpoint, and the like.

In some embodiments, the processor(s) 314 is a central processing unit (CPU), a graphics processing unit (GPU), or both CPU and GPU, or other processing unit or component known in the art.

The network device 300 also includes additional data storage devices (removable and/or non-removable) such as, for example, magnetic disks, optical disks, or tape. Such additional storage is illustrated in FIG. 3 by removable storage 316 and non-removable storage 318. Tangible computer-readable media can include volatile and nonvolatile, removable and non-removable media implemented in any method or technology for storage of information, such as computer readable instructions, data structures, program modules, or other data. The memory 302, the removable storage 316 and the non-removable storage 318 are all examples of computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by the network device 300. Any such tangible computer-readable media can be part of the network device 300.

The network device 300 can include input device(s) 320, such as a keypad, a cursor control, a touch-sensitive display, etc. Also, the network device 300 can include output device(s) 322, such as a display, speakers, etc. These devices are well known in the art and need not be discussed at length here.

As illustrated in FIG. 3, the network device 300 can include one or more wired or wireless transceiver(s) 324. In some wireless embodiments, to increase throughput, the transceiver(s) 324 can utilize multiple-input/multiple-output (MIMO) technology. The transceiver(s) 324 can be any sort of wireless transceivers capable of engaging in wireless, radio frequency (RF) communication, as discussed herein. The transceiver(s) 324 can also include other wireless modems, such as a modem for engaging in Wi-Fi, WiMax, Bluetooth, infrared communication, or the like.

Figure 4:
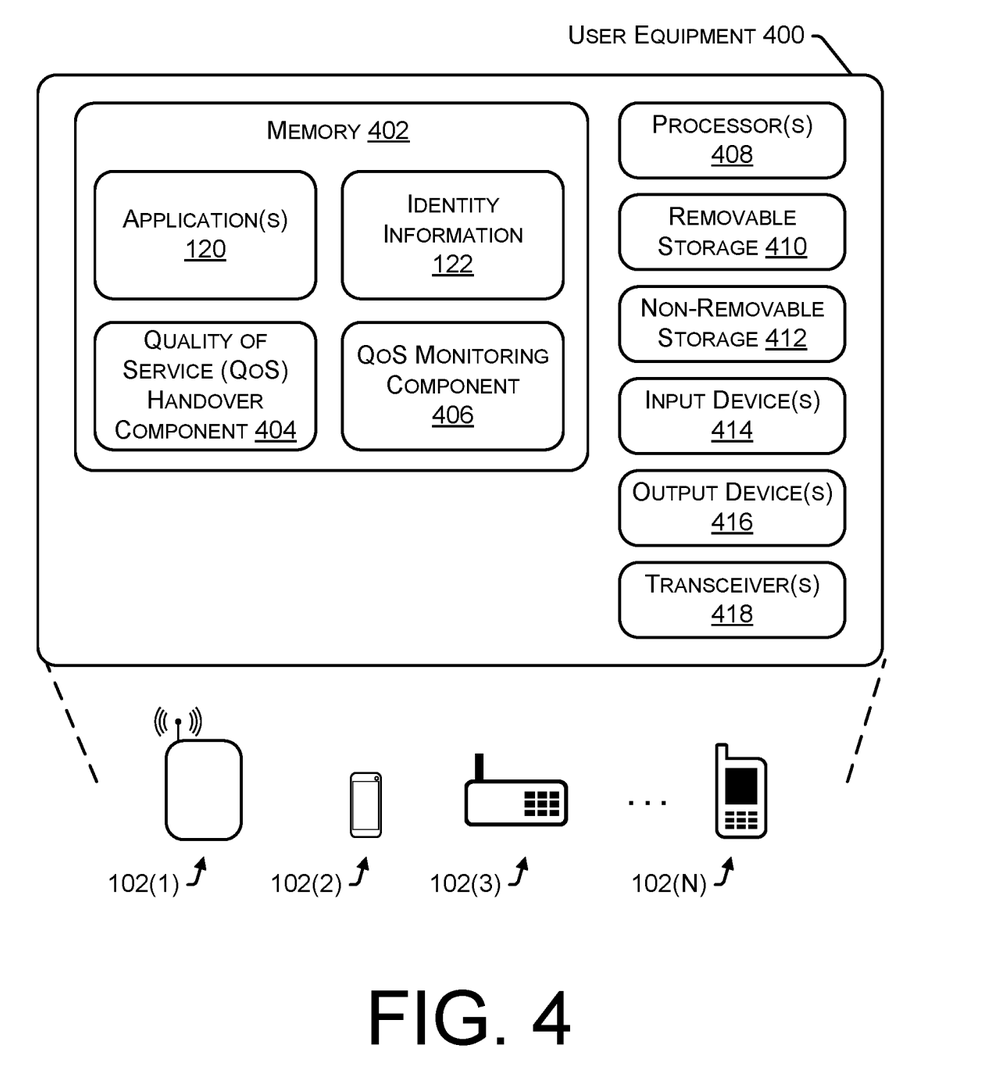
FIG. 4 illustrates an example user equipment configured to conduct communications in accordance with a QoS selected based, at least in part, on identity information, in accordance with embodiments of the disclosure.

FIG. 4 illustrates an example user equipment 400 configured to conduct communications in accordance with a QoS selected based, at least in part, on identity information, in accordance with embodiments of the disclosure. In some embodiments, the user equipment 400 can correspond to the user equipment 102, 202, 204, and 206 of FIGS. 1 and 2. It is to be understood in the context of this disclosure that the user equipment 400 can be implemented as a single device or as a plurality of devices with components and data distributed among them. By way of example, and without limitation, the user equipment 400 can be implemented as various user equipment 102(1), 102(2), 102(3), . . . , 102(M) (where M is an integer).

As illustrated, the user equipment 400 comprises a memory 402 storing one or more application(s) 120, identity information 122, a Quality of Service (QoS) handover component 404, and a QoS monitoring component 406. Also, the user equipment 400 includes processor(s) 408, a removable storage 410 and non-removable storage 412, input device(s) 414, output device(s) 416, and transceiver(s) 418.

In various embodiments, the memory 402 is volatile (such as RAM), non-volatile (such as ROM, flash memory, etc.) or some combination of the two. The one or more application(s) 120, the identity information 122, the QoS handover component 404, and the QoS monitoring component 406 stored in the memory 402 can comprise methods, threads, processes, applications or any other sort of executable instructions. The one or more application(s) 120, the identity information 122, the QoS handover component 404, and the QoS monitoring component 406 can also include files and databases.

In general, the one or more application(s) 120 can include, but is not limited to, a web browser application, a video streaming application, an audio streaming application, an online gaming application, and the like. During execution on the user equipment 400, each of the applications may be configured to cause the user equipment 400 to initiate data communications with a network device (e.g., the base station 104). In some instances, the applications(s) 120 can include an application identifier that can be included with a resource request, as discussed herein. For example, a QoS for a communication can be upgraded or downgraded based on an application identifier associated with a resource request.

In general, the identity information 122 can include information identifying the UE 400 and/or an identity of a user associated with the UE 400. In some instances, the identity information 122 can include, but is not limited to, one or more of an international mobile equipment identity (IMEI), an international mobile subscriber identity (IMSI), a username, a telephone number, an email address, and the like.

The QoS handover component 404 can include functionality to utilize a QoS when conducting an inter-system handoff. For example, in some instances, the UE 400 may be coupled to a first network, such as a Wi-Fi network, providing a first QoS to the UE 400. The QoS handover component 404 can store the first QoS, such that, when the UE 400 is handing over to another network not controlled by the same service provider, the UE 400 can provide the first QoS to a network device to indicate to the network device what QoS is to be provided to the UE 400. In this matter, when transitioning between a 5G network and a Wi-Fi network, for example, the QoS handover component 404 can ensure a consistent QoS (or nearly consistent QoS) for a consistent user experience.

The QoS monitoring component 406 can include functionality to monitor, at the UE, a QoS of a communication and to report the QoS to a network device. For example, the QoS monitoring component 406 can determine a delay associated with data packets by comparing timestamps between transmission and reception. Further, the QoS monitoring component 406 can determine packet jitter by determining when packets are out of order in a stream of packets. In some examples, an application (e.g., one of the application(s) 120) can provide an indication of when a video player is buffering, which may indicate when a bandwidth is insufficient for a communication type. Of course, the QoS monitoring component 406 can monitor any appropriate consideration for QoS.

In some embodiments, the processor(s) 408 is a central processing unit (CPU), a graphics processing unit (GPU), or both CPU and GPU, or other processing unit or component known in the art.

The user equipment 400 also includes additional data storage devices (removable and/or non-removable) such as, for example, magnetic disks, optical disks, or tape. Such additional storage is illustrated in FIG. 4 by removable storage 410 and non-removable storage 412. Tangible computer-readable media can include volatile and non-volatile, removable and non-removable media implemented in any method or technology for storage of information, such as computer readable instructions, data structures, program modules, or other data. The memory 402, the removable storage 410 and the non-removable storage 412 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the user equipment 400. Any such tangible computer-readable media can be part of the user equipment 400.

The user equipment 400 may be configured to communicate over a telecommunications network using any common wireless and/or wired network access technology. Moreover, the user equipment 400 may be configured to run any compatible device operating system (OS), including but not limited to, Microsoft Windows Mobile, Google Android, Apple iOS, Linux Mobile, as well as any other common mobile device OS.

The user equipment 400 also can include input device(s) 414, such as a keypad, a cursor control, a touch-sensitive display, voice input device, etc., and output device(s) 416 such as a display, speakers, printers, etc. These devices are well known in the art and need not be discussed at length here.

As illustrated in FIG. 4, the user equipment 400 also includes one or more wired or wireless transceiver(s) 418. For example, the transceiver(s) 418 can include a network interface card (NIC), a network adapter, a LAN adapter, or a physical, virtual, or logical address to connect to various networks or the network devices illustrated in the environments 100 and 200, for example. To increase throughput when exchanging wireless data, the transceiver(s) 418 can utilize multiple-input/multiple-output (MIMO) technology. The transceiver(s) 418 can comprise any sort of wireless transceivers capable of engaging in wireless, radio frequency (RF) communication. The transceiver(s) 418 can also include other wireless modems, such as a modem for engaging in Wi-Fi, WiMax, Bluetooth, infrared communication, and the like.

Figure 5:
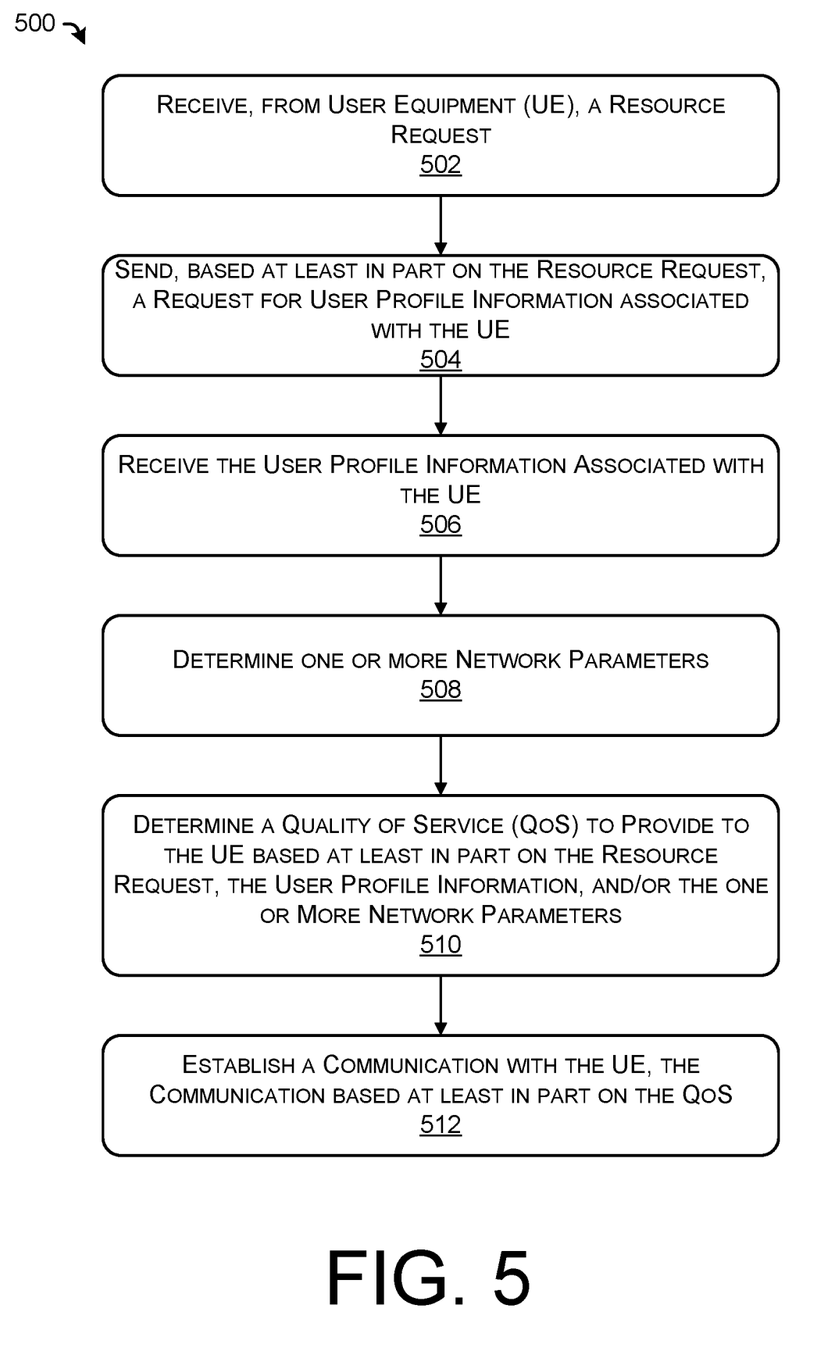
FIG. 5 illustrates an example process for dynamically determining a QoS for a communication based at least in part on a resource request, user profile information, and/or network parameters, in accordance with embodiments of the disclosure.
Figure 6:
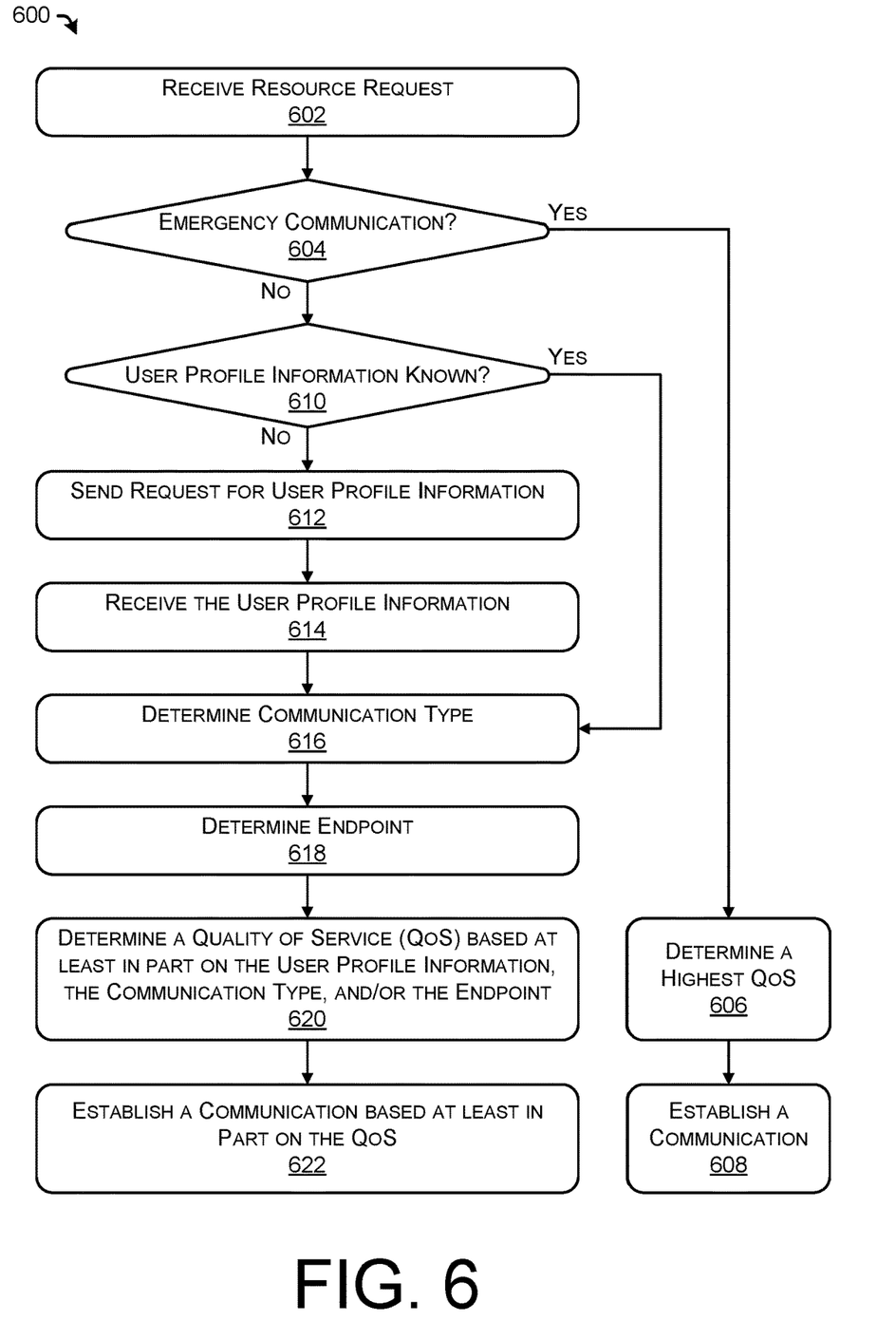
FIG. 6 illustrates another example process for dynamically determining a QoS for a communication based at least in part on a resource request, user profile information, and/or network parameters, in accordance with embodiments of the disclosure.

FIGS. 5 and 6 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 5 illustrates an example process for dynamically determining a QoS for a communication based at least in part on a resource request, user profile information, and/or network parameters, in accordance with embodiments of the disclosure. The example process 500 can be performed by the base station 104 (or another component), in connection with other components discussed herein. Some or all of the process 500 can be performed by one or more devices, equipment, or components illustrated in FIGS. 1-4, for example.

At operation 502, the process can include receiving, from a user equipment (UE), a resource request. In some instances, the resource request can include identity information, a communication type, an endpoint, and the like. In some instances, the resource request may be included in a SIP message/invite to initiate a communication session. In some instances, the resource request can be received in connection with a hand-in procedure. For example, when a UE requests to connect with a base station, the UE can send at least identity information (e.g., with or without a request for a communication).

At operation 504, the process can include sending, based at least in part on the resource request, a request for user profile information (e.g., a profile request) associated with the UE. In some instances, the base station 104 can transmit a profile request via a PGW (e.g., the PGW 108) and/or a PCF (e.g., the PCF 110) to be received by a user profile database (e.g., the user profile database 116). In some instances, the profile request can include at least a portion of the identity information received in the operation 502. In some instances, the profile request can include an indication of the identity information.

At operation 506, the process can include receiving the user profile information associated with the UE. In some instances, the user profile information (also referred to as profile information) can be received in response to the profile request.

At operation 508, the process can include determining one or more network parameters. For example, the operation 508 can include determining one or more congestion levels of a network, as discussed herein. The operation 508 can further include determining whether a congestion level meets or exceeds a threshold, which may indicate whether the dynamic QoS operations discussed herein should be implemented. That is, in some instances, a first set of QoS policies can be implemented when congestion is present, while in some instances, a second set of QoS policies can be implemented as the dynamic QoS operations, as discussed herein.

At operation 510, the process can include determining a Quality of Service (QoS) to provide to the UE based at least in part on the resource request, the user profile information, and/or the one or more network parameters. For example, a QoS can be based at least in part on communication type, endpoint, and the like. As discussed above, in some instances, a QoS can be selected based on a subscriber level associated with a user or a UE. In some instances, the dynamic QoS techniques discussed herein can be implemented based on the one or more network parameters, for example, indicating that congestion is present in a network.

At operation 512, the process can include establishing a communication with the UE, the communication based at least in part on the QoS. In some instances, the operation 512 can include monitoring a QoS of a communication to ensure that the actual QoS of the communication is within a threshold value (or is not worse, etc.) than the assigned QoS associated with that communication.

FIG. 6 illustrates another example process for dynamically determining a QoS for a communication based at least in part on a resource request, user profile information, and/or network parameters, in accordance with embodiments of the disclosure. The example process 600 can be performed by the base station 104 (or another component), in connection with other components discussed herein. Some or all of the process 600 can be performed by one or more devices, equipment, or components illustrated in FIGS. 1-4, for example.

At operation 602, the process can include receiving a resource request. In some instances, the resource request can be received from a UE and can include identity information, a communication type, an endpoint, and the like. In some instances, the resource request may be included in a SIP message/invite to initiate a communication session. In some instances, the resource request can be received in connection with a hand-in procedure. For example, when a UE requests to connect with a base station, the UE can send at least identity information (e.g., with or without a request for a communication).

At operation 604, the process can include determining whether the resource request is associated with an emergency communication. For example, an emergency communication may include an e911 call directed to a public safety answering point (PSAP). If the communication is an emergency communication, the process continues to an operation 606.

At operation 606, the process can include determining a highest QoS. As indicated in the flow diagram in FIG. 6, in some instances the operations may omit intermediary operations of determining a user profile and/or other intermediate steps. Instead, at the operations 606, the highest QoS can be selected based on the communication being an emergency communication. In some instances, the highest QoS can correspond to an absolute highest QoS providable by the base station, and in some instances, the highest QoS can correspond to any level of QoS above a QoS level to ensure a particular bit rate (or delay, jitter, or any other appropriate consideration for QoS) for a communication.

At operation 608, the process can include establishing a communication. In some instances, the communication can be established in accordance with the QoS determined in the operation 606.

If the communication associated with the resource request is not an emergency communication (e.g., "no" in operation 604), the process continues to the operation 610.

At operation 610, the process can include determining whether user profile information associated with the resource request is known (e.g., by the base station 104). In some instances, profile information may be stored locally at the network device, for example, in connection with an ongoing communication or a recently complete communication. If the user profile information is not known (e.g., "no" in operation 610), the process continues to operation 612.

At operation 612, the process can include sending a request for user profile information. For example, the base station 104 can send a request (also referred to as a profile request) via the PGW 108 and/or the PCF 110 to the user profile database 116. In some instances, the request can include the identity information received in the operation 602 or an indication of such identity information.

At operation 614, the process can include receiving the user profile information, for example, from the user profile database, at the base station 104. In some instances, the user profile information (also referred to as profile information) can include a subscriber level, which may correspond to a relative priority of communications associated with a UE or a user.

At operation 616, the process can include determining a communication type. For example, the resource request may include an indication of the communication type associated with the communication, such as, but not limited to, a voice call, video call, e911, real time text (RTT), rich communication services (RCS), short message service (SMS), multimedia messaging service (MMS), web browsing (e.g., data/application), and the like. In some instances, the operation 616 can include determining that the resource request was sent in connection with a communication invite (e.g., a SIP message/invite) and/or that the resource request includes the communication type information (or includes the communication invite).

Briefly returning to the operation 610, if the user profile information is known (e.g., "yes" in operation 610), the process may continue to the operation 616. Thus, in some instances, additional processing and/or signaling can be avoided or obviated when some or all of the user profile information is stored locally, as discussed herein.

At operation 618, the process can include determining an endpoint of a communication. For example, the endpoint can include, but is not limited to, a website, a server address, a telephone address, an email address, and the like. In some instances, the operation 618 can include determining a status of the endpoint (e.g., whether the endpoint is associated with an upgraded or downgraded QoS for communications involving the endpoint).

At operation 620, the process can include determining a Quality of Service (QoS) based at least in part on the user profile information, the communication type, and/or the endpoint. As discussed above, a QoS can be determined on a per-communication basis, and the QoS may vary based on any number of factors, as discussed herein.

At operation 622, the process can include establishing a communication based at least in part on the QoS. In some instances, the communication can be conducted by and between at least the UE 102, the RAN 106, and the endpoints 118, as discussed herein. In some cases, the operation 622 can include monitoring a QoS of a communication to ensure that the actual QoS of the communication is within a threshold value (or is not worse, etc.) than the QoS associated with that communication.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more processors;
a memory; and
one or more components stored in the memory and executable by the one or more processors to perform operations comprising:
receiving, at a base station of a radio access network, a resource request from a user equipment (UE), the resource request including a previous Quality of Service (QoS) provided to the UE at a previous time;
sending, based at least in part on the resource request, a request for user profile information, the request for user profile information including one or more of an international mobile equipment identity (IMEI) or an international mobile subscriber identity (IMSI) associated with the UE;
receiving, from a user profile database, the user profile information;
determining one or more network parameters indicative of at least a congestion level of a network;
determining a QoS to provide to the UE based at least in part on the resource request, the user profile information, the one or more network parameters, and the previous QoS; and
establishing, using the network, a communication with the UE, the communication based at least in part on the QoS.

2. The system of claim 1, wherein the network is a 5G network utilizing wireless communication in at least one of a 600 MHz band or a 3500 MHz band.

3. The system of claim 1, wherein the operations further comprise:
   determining at least one of a bandwidth, a transmission delay, a packet jitter, or a packet loss associated with the QoS; and
   transmitting data to or from the UE based on the at least one of the bandwidth, the transmission delay, the packet jitter, or the packet loss associated with the QoS.

4. The system of claim 1, wherein the operations further comprise:
   determining that the congestion level of the network meets or exceeds a threshold congestion level;
   determining, based at least in part on the user profile information, that the UE is associated with a priority user level; and
   determining the QoS based at least in part on the priority user level.

5. The system of claim 1, wherein the operations further comprise:
   determining, based at least in part on the resource request, a communication type, wherein the communication type is one of a voice communication, a video communication, a data communication, or an emergency communication;
   wherein the QoS is based at least in part on the communication type.

6. The system of claim 1, wherein the operations further comprise:
   determining, based at least in part on the resource request, an endpoint associated with the communication;
   wherein the QoS is based at least in part on the endpoint associated with the communication.

7. A device comprising:
   one or more processors;
   a memory storing a previous Quality of Service (QoS) provided to the UE at a previous time; and
   one or more components stored in the memory and executable by the one or more processors to perform operations comprising:
      receiving a resource request from a user equipment (UE), the resource request including the previous QoS;
      sending, based at least in part on the resource request, a request for profile information;
      receiving, from a profile database, the profile information;
      determining one or more network parameters indicative of a state of a network;
      determining a QoS associated with the UE based at least in part on the profile information and the one or more network parameters; and
      establishing a communication with the UE, the communication based at least in part on the QoS.

8. The device of claim 7, wherein the resource request is a first resource request, wherein the QoS is a first QoS, wherein the communication is a first communication, and wherein the operations further comprise:
   determining a first communication type associated with the first resource request;
   receiving a second resource request from the UE;
   determining a second communication type associated with the second resource request;
   determining that the first communication type is different than the second communication type; and
   establishing a second communication with the UE, the second communication based at least in part on a second QoS.

9. The device of claim 7, wherein the resource request is a first resource request, wherein the UE is a first UE, wherein the request for profile information is a first request for first profile information, wherein the profile information is first profile information, wherein the QoS is a first QoS, wherein the communication is a first communication, and wherein the operations further comprise:
   receiving a second resource request from a second UE;
   sending, based at least in part on the second resource request, a second request for second profile information;
   receiving, from the profile database, the second profile information;
   determining a second QoS associated with the second UE based at least in part on the second profile information and the one or more network parameters; and
   establishing a second communication with the second UE, the second communication based at least in part on the second QoS.

10. The device of claim 9, wherein the first profile information is associated with a first subscriber level, and wherein the second profile information is associated with a second subscriber level different than the first subscriber level.

11. The device of claim 7, wherein the resource request is a first resource request, wherein the UE is a first UE, wherein the QoS is a first QoS, wherein the communication is a first communication, and wherein the operations further comprise:
   receiving a second resource request from a second UE;
   determining that the second resource request is associated with an emergency communication; and
   establishing a second communication with the second UE, the second communication based at least in part on a highest QoS.

12. The device of claim 7, wherein the network is a 5G network utilizing wireless communication in at least one of a 600 MHz band or a 3500 MHz band.

13. The device of claim 7, wherein the determining the one or more network parameters indicative of the state of the network comprises determining that a congestion level of the network meets or exceeds a threshold congestion level; and
   wherein the operations further comprise:
      determining, based at least in part on the profile information, that the UE is associated with a priority user level; and
      determining the QoS based at least in part on the priority user level.

14. The device of claim 7, wherein the operations further comprise:
   determining, based at least in part on the resource request, a communication type, wherein the communication type is one of a voice communication, a video communication, a data communication, or an emergency communication;
   wherein the QoS is based at least in part on the communication type.

15. The device of claim 7, wherein the operations further comprise:
   determining, based at least in part on the resource request, an endpoint associated with the communication;
   wherein the QoS is based at least in part on the endpoint associated with the communication.

16. A method implemented by one or more processors, the method comprising:

receiving, at a base station of a radio access network, a resource request from a user equipment (UE), the resource request including a previous Quality of Service (QoS) provided to the UE at a previous time;

sending, via a packet data network gateway (PGW) and a policy control function (PCF), and based at least in part on the resource request, a request for user profile information;

receiving, from a user profile database, the user profile information;

determining one or more network parameters indicative of a state of a 5G network;

determining a Quality of Service (QoS) associated with the UE based at least in part on the user profile information, the one or more network parameters, and the previous QoS; and  establishing, using the 5G network, a communication with the UE, the communication based at least in part on the QoS.

17. The method of claim 16, wherein the method further comprises:

determining at least one of a bandwidth, a transmission delay, a packet jitter, or a packet loss associated with the QoS; and  transmitting data to or from the UE based on the at least one of the bandwidth, the transmission delay, the packet jitter, or the packet loss associated with the QoS.

18. The method of claim 16, wherein the method further comprises:

determining that a congestion level of the 5G network meets or exceeds a threshold congestion level;

determining, based at least in part on the user profile information, that the UE is associated with a priority user level; and  determining the QoS based at least in part on the priority user level.

19. The method of claim 16, wherein the method further comprises:

determining, based at least in part on the resource request, a communication type, wherein the communication type is one of a voice communication, a video communication, a data communication, or an emergency communication;

wherein the QoS is based at least in part on the communication type.

20. The method of claim 16, wherein the method further comprises:

determining, based at least in part on the resource request, an endpoint associated with the communication;

wherein the QoS is based at least in part on the endpoint associated with the communication.

\* \* \* \* \*